July 14, 1925.
W. McCLAVE
STOKER
Filed July 24, 1919
1,545,783
7 Sheets-Sheet 3
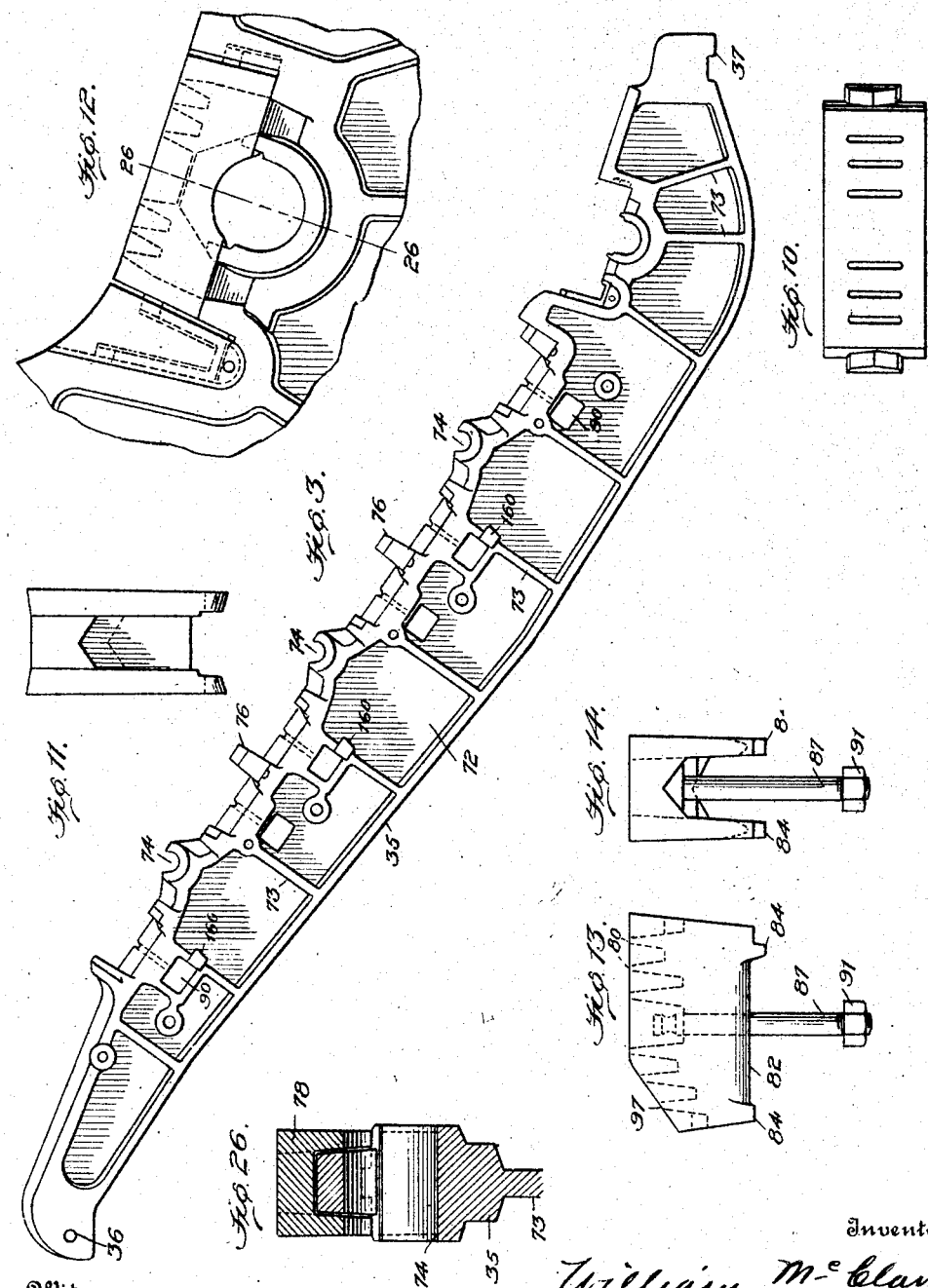

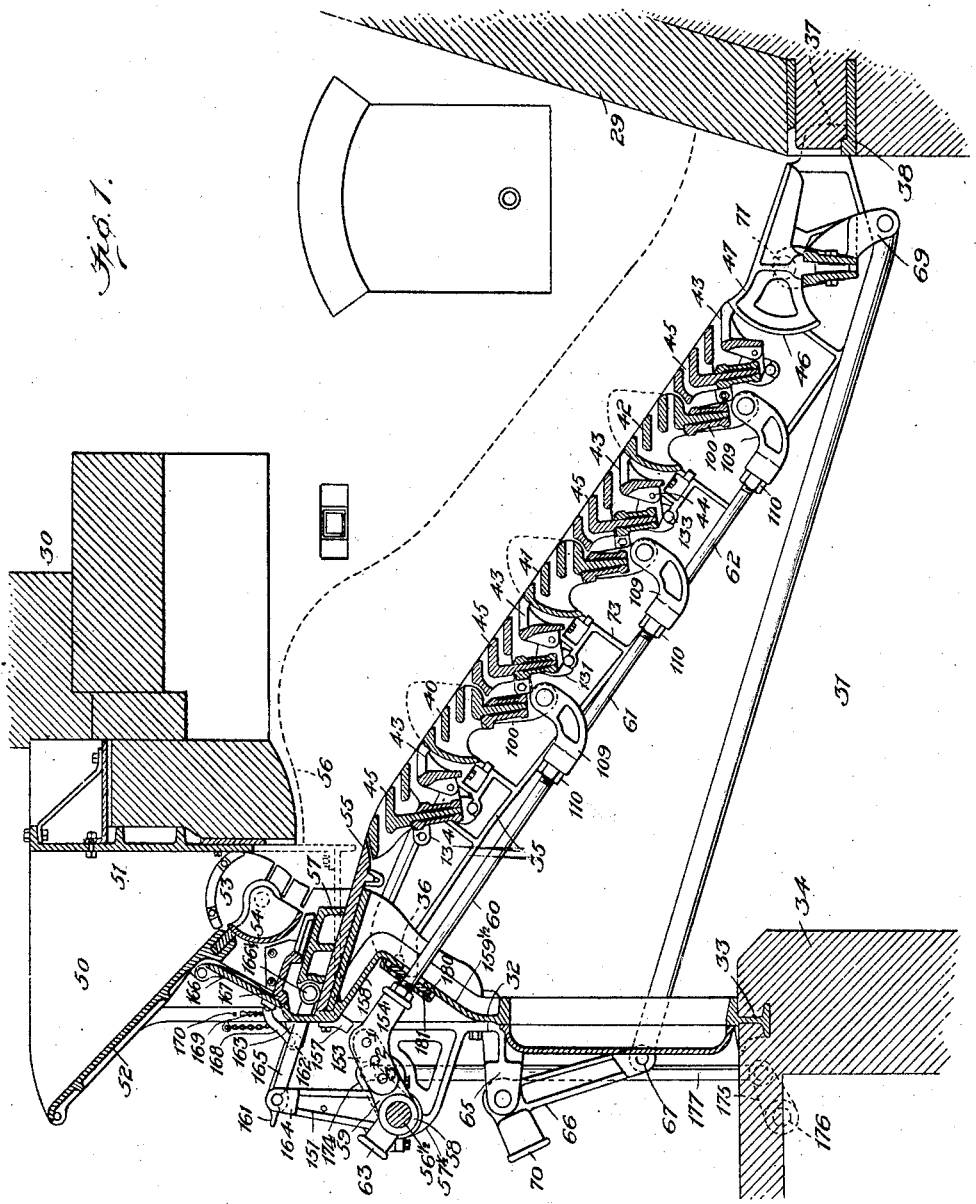

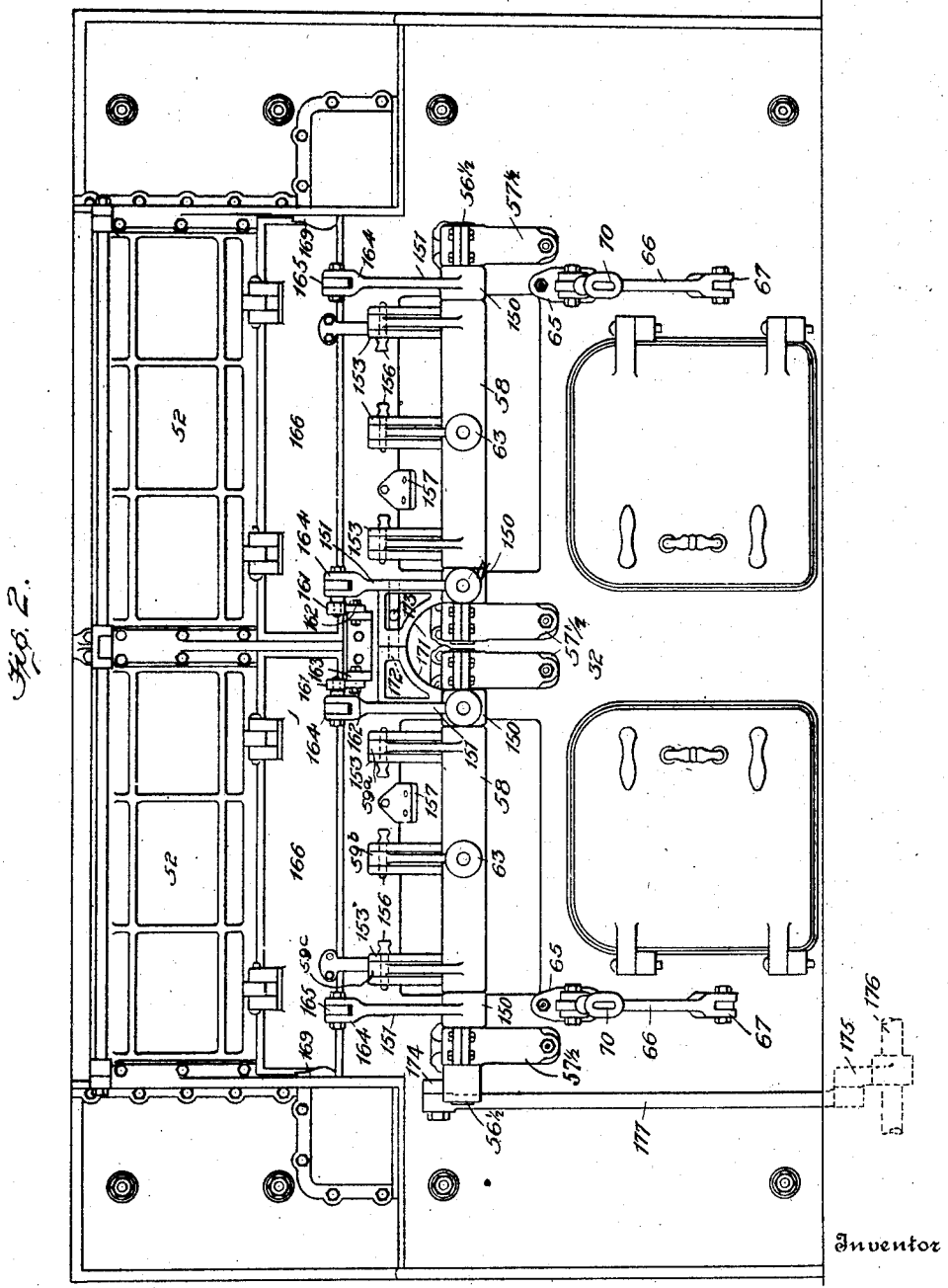

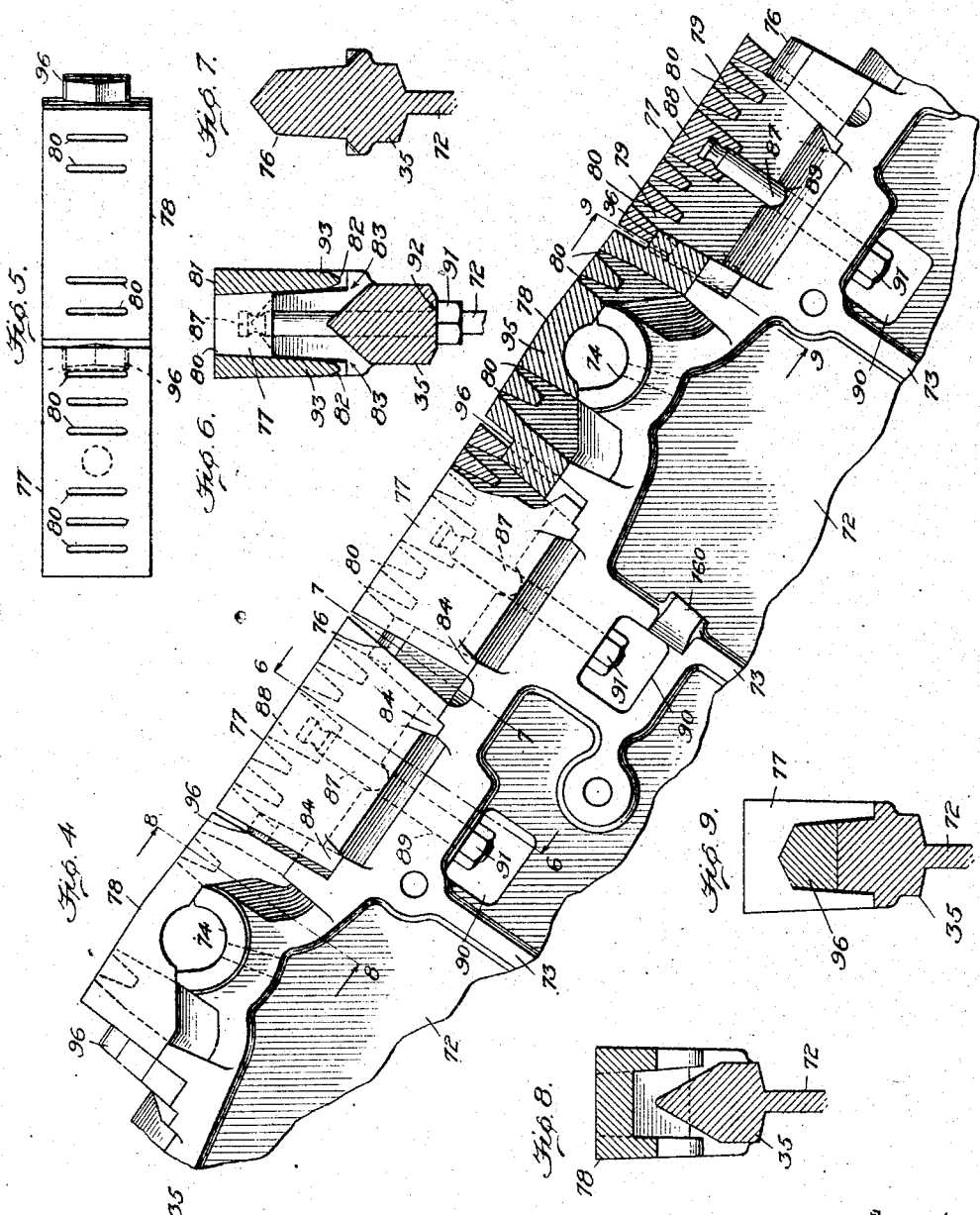

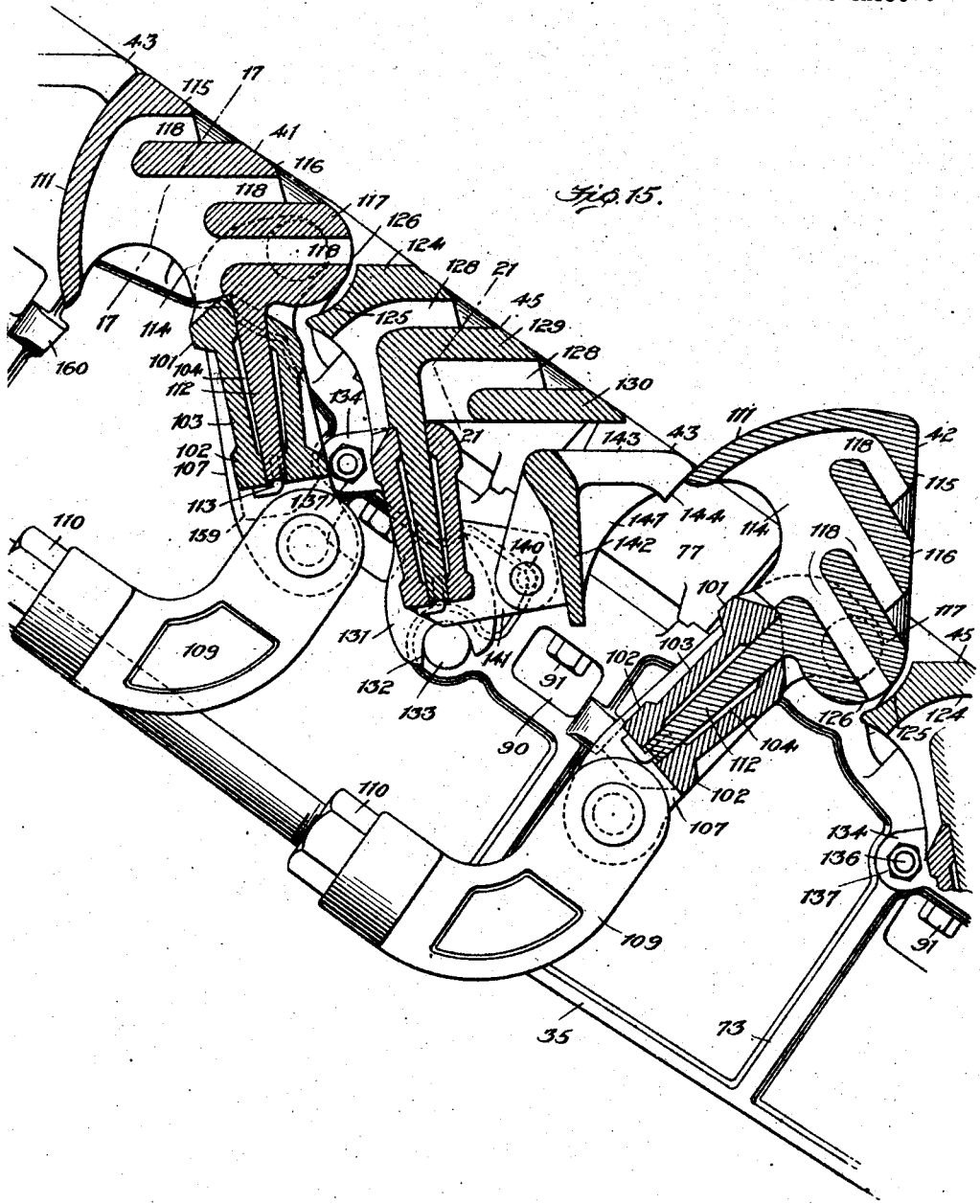

July 14, 1925.
W. McCLAVE
STOKER
Filed July 24, 1919
1,545,783
7 Sheets-Sheet 6
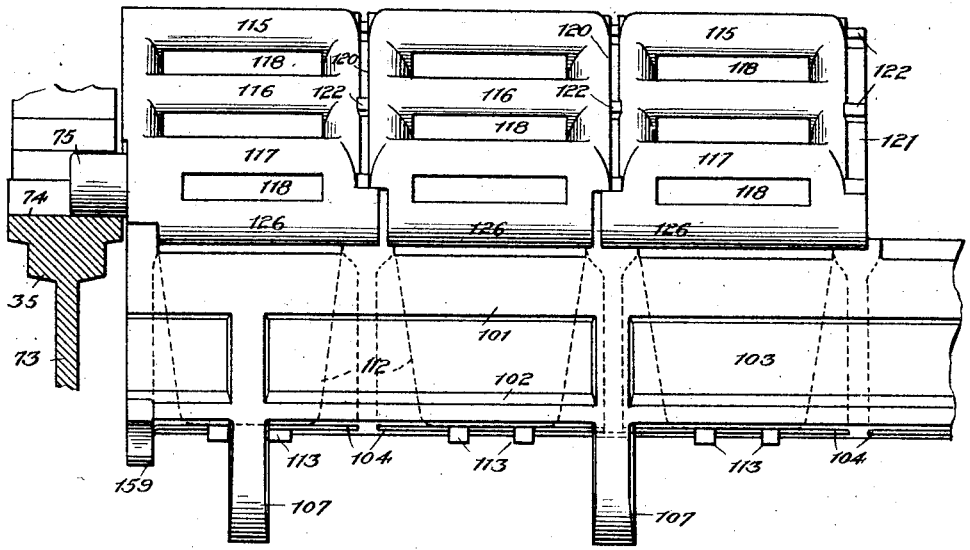
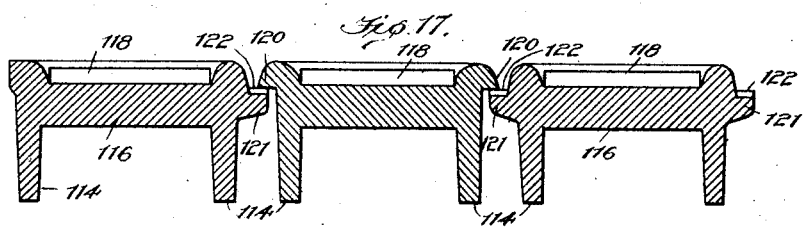
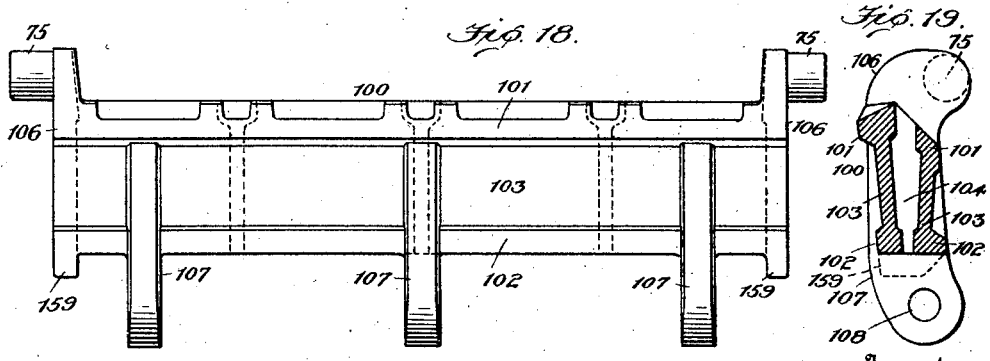
Witness
Edwin L. Bradford
Inventor
William McClave
By his Attorneys July 14, 1925. 1,545,783
W. McCLAVE
STOKER
Filed July 24, 1919 7 Sheets-Sheet 7
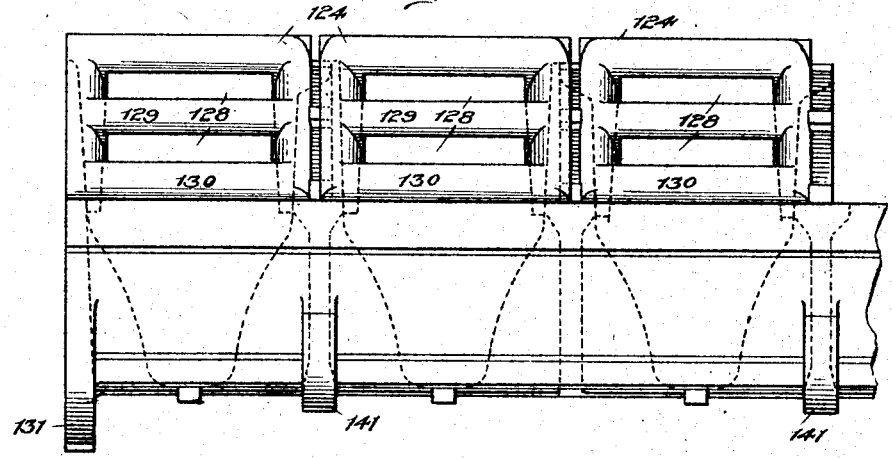
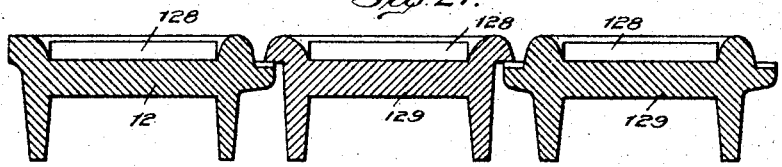
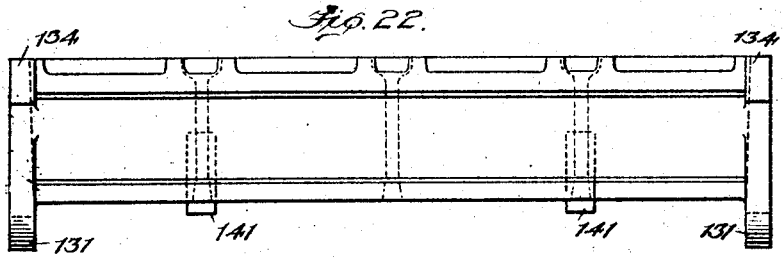
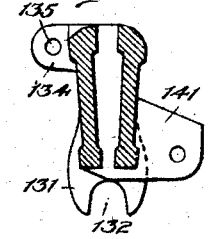
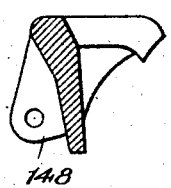
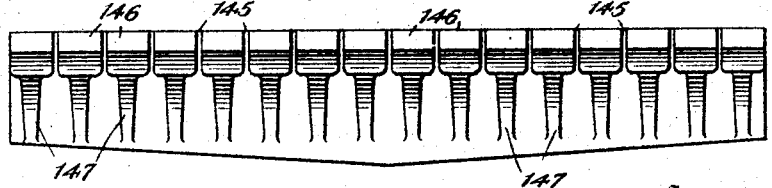
Witness
Edwin L. Bradford
Inventor
William McClave
By
his Attorneys Patented July 14, 1925.

1,545,783

UNITED STATES PATENT OFFICE.

WILLIAM McCLAVE, OF SCRANTON, PENNSYLVANIA, ASSIGNOR TO McCLAVE-BROOKS COMPANY, OF SCRANTON, PENNSYLVANIA, A CORPORATION OF PENNSYLVANIA.

STOKER.

Application filed July 24, 1919. Serial No. 312,969.

*To all whom it may concern:*

Be it known that I, WILLIAM McCLAVE, a citizen of the United States, residing at Scranton, in the county of Lackawanna and State of Pennsylvania, have invented certain new and useful Improvements in Stokers; and I do hereby declare the following to be a full, clear, and exact description of the same, reference being had to the accompanying drawings, forming part of this specification.

This invention relates to furnace construction and particularly the mechanism for delivering coal from the hopper to the bed and for forcing the delivered coal down the inclined fuel bed at proper intervals during combustion, finally arriving as ash at the dump grate located, as is customary, at the lower end of the grate. The principal object of this invention is to improve the mechanism of the various steps of moving the coal in its travel from the hopper to the ashpit, and this object is attained by various improvements which co-operate together to secure the desired result. One of the novel features of such improvement is the provision of stationary and movable grate bars placed alternately in the combustion chamber, these movable and stationary bars being of the well known step grate type save that they have sectional tops with integral flattened shanks received in socketed bars, each alternate bar being pivoted and each of the sectional tops being rabbeted on each side, in order to provide not only for the expansion of the metal due to heat, but also the gradual growth of the metal, these two conditions together causing the usual warping and deformation of grate structures, which is practically obviated by the present construction. A second feature is the provision of means whereby each movable grate bar may be tilted on its pivot to the desired degree while other movable grate bars are moved to a greater degree or a less degree; or may even be stationary, while another bar is being tilted, thus providing for a graduated movement of the grate bars at will with the possibility of making the movement of all of the movable grate bars simultaneous, and of equal degree, the latter providing for the even shifting of the fuel down the bed towards the dump grate. A third element of novelty disclosed in the present application is in the provision of means for moving the pusher bars, such mechanism being carried on a central shaft, which, in turn, forms the fulcrum or pivot for the mechanism which tilts the movable grate bars.

The tops of each of the grate bars are so constructed as to provide against warping due to expansion and growth and also to provide for a non-sifting bed, this being taken care of in part by pivoting a longitudinal follower bar to each stationary grate bar and having this follower bar so pivoted that by the force of gravity it is held in contact with the movable grate bar, thus preventing at all times the sifting of the fuel through the grate, and yet possessing all of the advantageous features of an openwork grate. Aside from these four main features, other objects of invention will be disclosed by the detailed description following.

In the drawings,—

Figure 1 represents a vertical section through the grate of a furnace illustrating in elevation the mechanism by which the pushers and grate bars are operated.

Fig. 2 is a front elevation of a small two-unit furnace embodying my invention.

Fig. 3 is an elevation of the large beam of the carrier bar, such beam being shown stripped of all parts for clearness of illustration.

Fig. 4 is a partial elevation of one of the carrier bars in its assembled form, showing the sectional slotted tops in cross section.

Fig. 5 is a top plan view of two of the tops.

Fig. 6 is a section on line 6—6 of Fig. 4.
Fig. 7 is a section on line 7—7, Fig. 4.
Fig. 8 is a section on line 8—8, Fig. 4.
Fig. 9 is a section on line 9—9, Fig. 4.

Fig. 10 is a plan view of one of the sectional tops fitting over one of the journals, illustrating particularly the extended lugs whereby this section is held down on the trunnion of the movable element.

Fig. 11 is an end elevation of one of the tops next to the dump grate.

Fig. 12 is a side elevation of the parts of the carrier bar in proximity to the journal for the dump grate section.

Fig. 13 is a side elevation of the section of the carrier bar top nearest the furnace front.

Fig. 14 is an elevation at right angles thereto.

Fig. 15 is a partial section of the central portion of the grate as shown in Fig. 1, but on a larger scale, and illustrates one of the movable grate bars in elevated position to show the relation of the follower bar in closing the gap between the proximate sections.

Fig. 16 is an elevation of the movable grate bars looking toward the front of the furnace.

Fig. 17 is a section on line 17—17 of Fig. 15.

Fig. 18 is an elevation of the movable slotted grate bar with the tops removed.

Fig. 19 is a vertical central section of the same.

Fig. 20 is a view similar to Fig. 16, but of the stationary grate bar.

Fig. 21 is a section on line 21—21 of Fig. 15.

Fig. 22 is an elevation of the stationary slotted grate bar with the tops removed.

Fig. 23 is a vertical section through the center thereof.

Fig. 24 is an elevation of the follower bar.

Fig. 25 is a vertical sectional elevation of the same.

Fig. 26 is a section on line 26—26 of Fig. 12.

Referring now to Fig. 1, the furnace is of the step grate type having the usual rear wall 29, upper masonry 30, ashpit 31, and metal furnace front 32, supported by an I-beam 33 embedded in the usual front pier or wall 34. Extending from the front 32 to the rear wall 29 are placed the carrier bars 35 bolted to the front wall through holes 36 and having hooks 37 engaging in a metal reinforcement 38 in the rear wall. Arranged between these carrier bars and longitudinally of the furnace are a series of movable grate bars 40, 41 and 42 above each of which is a single follower bar 43 pivoted as at 44 to the stationary grate bars 45, one of these stationary bars being above the top-most movable bar 40 and another stationary grate bar and its accompanying follower bar 43 being located below the lowermost movable grate bar 42, the lower follower bar cooperating with the smooth rounded surface 46 of the dump grate 47, the latter being of the usual construction and forming no particular part of the present invention, save in combination with the novel features.

The supply of coal is led from the hopper 50 defined between the rear plate 51 and the slanting hopper front 52. The coal passes through the narrow mouth 53, past a cut-off gate 54, and falls to the dead plate 55 of the furnace. From here the coal is pushed onto the bed 56 by means of a reciprocating pusher 57 of ordinary construction. A shaft 56½ mounted in brackets 57½ extending from the furnace front 32, provides a pivot for the sleeve 58 to which are rigidly attached arms 59 which are preferably integral with the sleeve, these arms being connected with the rods 60, 61, 62, which operate the movable grate bars 40, 41 and 42, respectively, movement being imparted to the grate bars by turning the sleeve 58 on the shaft 56½ by means of the usual steel hand lever (not shown) which is inserted in the socket in the boss 63 in the center of the sleeve 58. To one side of each furnace unit is a small bracket 65 pivotally carrying an angle arm 66 having a connection 67 at its lower end to a link pivoted to the offset arms 69 of the dump grate, so that by inserting the proper hand lever in the socket of the boss 70 the angle arm 66 may be moved about its pivot, this in turn moving the dump grate 47 about its pivot 71 and permitting the burned out coal or ash to drop into the pit 31, in the usual way.

The general operation of the furnace has now been described and the details of the various parts as illustrated in the remaining figures will be explained.

Referring now to Fig. 3, illustrating the carrier bar 35, this bar as before stated extends from the connection 36 at the front end of the furnace to the rear wall 38 and furnishes the support for all of the grate bars and also the dump grate. The bar is therefore built in truss style with thickened top and bottom flanges, as shown in a number of the small sectional views, and has a relatively thin central web 72 reinforced at regular intervals by the stiffening ribs 73, there being a rib equispaced on either side of each of the bearings 74, these bearings affording support for the trunnions 75 of the movable grate bars. Between each pair of trunnions 75 is a raised projection 76 having sloping sides so as to firmly seat the sectional caps 77 which serve two purposes, one to prevent harm to the bar 35, due to the heat of the furnace, and the other to afford means for locking down the caps 78 which cooperate with the bearings 74 in holding down the trunnions 75 of the movable grate bars.

The sectional caps 77 are rectangular in plan and are provided with a plurality of air openings 79 terminating at the upper section or face in narrow elongated slots 80, preferably 6 in number, as shown in Fig. 5. The sides of these caps taper very slightly inwardly from the face 81 to the bottom edge 82 at which point an air inlet 83 is formed since the edge 82 is not only spaced away from the metal of the bar but is also tapered sharply inwardly to provide such air space. At their four lower corners the sectional caps 77 are provided with feet 84 which seat in recesses in the bar 35 and this engagement is made secure by the bolt 87 embedded in the central portion 88 of the cap 77 and extending through a cored passage 89 to a hole 90 cut away in the web 72 such construction being best shown in Fig. 6, which shows the nut 91 on the bolt 87, such bolt being just a little greater in diameter than the thickness of the web. It will also be noted from this figure that the nut 91 which is preferably of non-corrodible metal engages a flat surface 92 at the bottom of a thickened portion of the bar 35 and also that the thickened portion of the bar 35 is generally V-shaped at its top portion to assist in the formation of air inlets from either side of the carrier bar. This air, under pressure or otherwise, passes between the bar and the side flanges 93 of the sectional caps and passes through the tapered air openings 79 to the slots 80 in the face of the caps, and in so passing cools the metal and prevents the carrier bar itself from being warped and at the same time supplies the air which is necessary in the combustion of the fuel.

The sectional caps 78 are somewhat similar to the caps 77 (see Figs. 4 to 9) but have only two slots 80 on either side of the central portion 95 which forms the cap plate of the bearings 74. At either end of the cap 78 is an extended lug 96 corresponding in height and shape to the projections 76 extending upwardly from the bar 35, these lugs being held down against the beam by means of their connection with the bolted caps 77 which overlap these lugs 96 on either side of the top 78.

The bolted cap section shown in Figs. 13 and 14 is similar to the caps 77 but is cut away at one corner as shown at 97 to form the front surface of the grate structure, this surface of the cut away corner being at an angle of preferably 35° to the top line of the grate and carrier bar caps so that said surface will be horizontally disposed when the sections are assembled in the grate structure.

Each of the movable grate bars consists of a slotted bar 100 each side of which has reinforcing ribs 101 and 102 at the top and bottom bounding the thinner web 103 so that each side of the grate bar shows in cross-section a structure somewhat like an I-beam thus forming an internal chamber 104 which is bounded at either end of the grate bar by the plate 106 which carries the trunnion 75 forming the pivot on which this slotted grate bar turns. Between these end plates 106 are located a number of lugs 107 corresponding in number to the number of movable grate bars in each vertical set, hence, in the present showing, three, each being pierced as at 108 to receive the angle connection 109 which is tapped to receive the threaded end of the appropriate connecting rod which is then locked in position by a lock nut 110, the location of the movable grate bar with respect to the front of the furnace determining which of the pierced lugs 107 is to receive the angle member 109, each of the grate bars, however, being identical in construction.

Referring now to Fig. 15, the upper protection for each movable grate bar is shown to consist of a plurality of hollow tops each having a rounded front wall 111 and an integral elongated shank 112 which passes through the chamber 104 to practically the lower limit of the flange 102 at the lower end of the slotted bar. Preferably, one or more small lugs 113 of relatively soft metal are embedded in the lower tip of the shank 112 and when the top is in proper position in the slotted bar these lugs are bent forwardly, as shown in Fig. 15 so as to clinch the top in place. These tops have side walls or flanges 114 and at their rear faces show a plurality of partitions 115, 116 and 117 spaced apart so as to form air openings 118 communicating with the front and lower sides of these tops, thus permitting a constant supply of air to the fuel bed.

Referring now to Fig. 17, particular attention is called to the rabbeting between the adjacent sectional tops. This joint being made by each alternate top having an extended shelf 120 on either side overlapping but not touching a co-operating shelf 121 on the adjacent top except for the small integral lugs or spacing blocks 122 which are positioned relatively far apart on either the shelf 120 or preferably on the shelf 121, as shown. This rabbet joint prevents sifting of the fuel through the grate and yet allows material expansion of the tops themselves and the length of the shelves and their overhang is such as to take care of the gradual growth of the metal as well as the expansion due to the heat of the furnace. The stepped horizontal partitions of the tops also prevent sifting of the fuel since these partitions lie in horizontal position in the normal operation of the grate and at the time the movable bars are tilted to force the fuel downwardly on the grate the spaces between the partitions are at such an angle as to throw such fuel as may be sifted onto the lower partition back to the bed and not downwardly into the ashpit.

Referring now to the stationary grate bar tops: These tops, it will be noted, are somewhat smaller than the movable tops and they also differ in replacing the curved front wall 111 by a short upper wall 124 concaved as at 125 to receive the rounded rear edge 126 of the movable grate bar top.

In this top there are but two air openings 128 located between the central partition 129 and the upper wall 124 and the lower wall 130, respectively.

The slotted bar for the stationary grate section is quite similar in central cross section to the similar part of the movable grate bar, but the former is provided with end plates 131 which are bifurcated at their lower ends to provide mouths 132 which straddle small lugs 133 integral with the carrier bar 35 forming the main support for these bars. At its upper and forward end each end plate 131 is provided with an angular lug 134 having a central hole 135 to receive a bolt 136 extending from the carrier bar and threaded to receive a nut 137 to hold the stationary grate bar in fixed position. By removing these two bolts 136 from the ends of the stationary grate bar, this bar may be then lifted right out of place from off the lugs 133, taking with it, of course, the follower bar 43 which is pivoted at 140 to the rearwardly extending lugs 141, positioned one on either side of the center of the stationary slotted grate bar.

The follower bar 43 consists of a vertical plate 142 and an integral slotted member 143 at right angles thereto and therefore horizontal and having at its rear edge a downturned portion 144 normally resting against the curved wall 111 of the movable grate bar top or in the lowermost follower bar 43 against the similar curved wall of the dump grate. The horizontal wall or shelf 143 of the follower bar is deeply slotted as at 145 at regular intervals throughout its length to provide for the proper passage of air and the necessary expansion and contraction, while minimizing the tendency to sifting and warping. Each of the fingers 146 formed by the slots 145 is centrally stiffened at its lower section by an angular bracket rib 147 providing the necessary strength, and at the front end of each follower bar there is a pair of pierced ears 148 located adjacent to the lugs 141 of the slotted bar and forming with them the pivotal connection whereby the follower bar is permitted to fall by gravity against the rounded face of the next lower element, thereby sealing the same against sifting of fuel and yet permitting free movement of such lower element as well as the necessary expansion and contraction of both members.

Referring now to Figs. 1 and 2 the sleeve 58 is loosely mounted on the shaft 56½ supported from the furnace front 32 by the brackets 57½ and is held against longitudinal movement thereon by the enlarged hubs 150 of the arms 151 which are keyed to the shaft 56½ and are held in place longitudinally of the shaft, not only by such keys but also by their being positioned between the pedestals 57½ and the sleeve 58. On each sleeve 58 are three integral arms 59$^a$, 59$^b$ and 59$^c$, which are received in the bifurcated heads 153 of the angle pieces 154 which are tapped at their rear ends to receive the threaded connecting rods 60, 61 or 62, as the case may be.

Preferably, the arm 59$^a$ nearest the center of the furnace in a two unit type is connected to the nearest movable grate bar section, thus being attached to connecting rod 60, while the central arm 59$^b$ will be connected to rod 61, thereby operating the central movable grate bar section, and the remaining arm 59$^c$ will be connected to the connecting rod 62 nearest the dump grate. Each of the bifurcated heads of the angle pieces 154 is provided with three holes which we will number 1, 2 and 3, in accordance with their distance from the front of the furnace and we have denoted the arms as 59$^a$, 59$^b$ and 59$^c$ in accordance with their distances from the center of the furnace. The pins 156, when not in use for connecting the head and arm through one of the three holes mentioned, are left in the little receiving bracket or holder 157 attached to the furnace front, just at the point where the front is indented sharply, forming a right angular recess having an upper wall 158 and a rear or lower wall 159½.

Now, when one of the pins 156 is inserted in hole No. 1 of arm 59$^a$, another pin in hole No. 1 of arm 59$^b$, and the third pin in hole No. 1 of arm 59$^c$, and the metal lever bar is inserted in the socket of the projecting boss 63 at the center of the sleeve 58 that moves the bars on the right hand side of the furnace and this lever is pulled downwardly so that the sleeve will revolve until the stops 159 at the lower portions of the movable grate bars strike against the lugs 160 extending from the carrier bar, and the action is reversed with the lever bar until the lugs on the grate bars are stopped, a complete full movement of all of the movable bars will be made during this action. Bear in mind, however, that the pusher arms 151 have not revolved in the foregoing action as they have been held by a hooked stop 161 pivoted at 162 to a small ear 163 on the furnace front and prevented from making any motion whatever for these pusher arms 151 are keyed to the shaft 56½ and do not revolve in the action described, it being only the sleeve 58 with its rigid arms 59 that is rotated on the shaft 56½ as a pivot.

Now, let us change the arrangement of the pins, i. e., put a pin in arm 59$^a$, hole 1, another in arm 59$^b$, hole 2, and a third pin in arm 59$^c$, hole 3, then, using the metal lever as before, we have a differential movement, the result being that the greatest movement is on the shortest rod, and the shortest movement is on the longest rod.

Now, let us again place the pins differently, i. e., insert pin in arm 59°, hole 1, another in arm 59ᵇ, hole 2, and another in arm 59ᵃ, hole 3. Then, by using the lever as before, we have the differential movement looking the other way, that is, the greatest movement at the rear end of the grate and the least movement at the front end of the grate. Again, should it be desired to give movement to only one of the movable bars, then the bar desired should be connected by placing a pin in the appropriate hole to produce the throw desired and the other two pins may be removed altogether, placing them in the holder 157 provided for that purpose and proceeding as before. It is needless to add that if two bars are to be moved instead of one it is merely necessary to place the two pins in the appropriate connections and remove the other pin altogether and proceed as before. The selective movement of the grate is one of the principal features of this invention, attention being particularly directed to the fact that only the alternate grate bars are moved, half of the grate bars being stationary, except for the slight pivoting of the relatively small follower bar 43 at the lower rear edge of each stationary bar. The two pusher arms 151 are as previously mentioned keyed to the shaft 56½ and each is bifurcated at its upper end 164 to receive a link 165 pivoted as at 166½ to the pusher bar 57.

While, for convenience of illustration the door 166 is shown resting against the sealing rib 167, this is the normal position only at night when the gate 54 is in closed position, i. e., at its upper limit of movement, and during the day, or rather the time the furnace is in operation, under full charge, the door 166 is raised by means of its handle 168 and held in elevated position by inserting a pin 169 in hole 170.

Under normal circumstances it is the intention to operate a furnace of the size illustrated entirely by hand, inserting the metal lever bar in the appropriate sockets to rock either the shaft 56½, the sleeve 58, or the dump grate section 47, and, for a small size furnace it will be found comparatively easy to operate both of the pusher bars together, and for such purpose as well as to connect up adjacent pusher bar sections for power operation, I provide an extended bracket 171, extending towards the adjacent section of the furnace from each arm 151 and I provide a sliding pin or bolt 172 loosely mounted in cored openings in each side of one bracket 171, so that this pin may be moved by means of its handle 173 so as to connect up adjacent brackets 171 or may be withdrawn entirely within the bracket 171 in which it is mounted, thus making the connection and disconnection of the pusher bar sections an extremely simple matter. In so operating by power, I preferably make use of a small crank arm 174 connected to a similar crank 175 on the power shaft 176 by means of a link 177 in an ordinary manner, preferably having the crank 175 at either the central portion of the furnace or at one side thereof and having but the one link 177 as will be understood.

To prevent passage of air through the slots formed for the reception of the connecting bars I mount a plate 180 on each connecting bar tightly fitting the same and permit this plate to slide on the wall 159½ in a pocket formed by a cover 181, thus reducing leakage to an inconsequential amount.

What is claimed is:

1. In a stoker structure, a plurality of rocking grate bars, a boiler front having an indented portion provided with a plurality of slots, brackets on said front, a shaft mounted in said brackets, arms on said shaft, rods passing thru said slots and pivotally and adjustably connecting said arms and said grate bars, and a slide closely fitting each rod and resting against said indented portion to close the exposed portions of said slots, each of said slides lying substantially normal to the axes of said rods.

2. In a grate structure, a plurality of rocking grate bars, a rod adjustably connected to each bar, a head secured to each rod, a rocking shaft, a plurality of arms movable with said shaft and in proximity to said heads, and means for securing a head to its arm in any one of a plurality of points, whereby the angle of rocking of one grate bar may be varied without affecting the angle of rocking of the remaining grate bars.

3. In a stoker structure, a main shaft, a pusher, connections between said pusher and said shaft, a plurality of rocking grate bars, a sleeve loosely mounted on said main shaft, and means detachably and adjustably connecting each of said rocking grate bars with said sleeve.

4. In a non-shifting grate structure, a grate bar consisting of a plurality of end members each having a forked bottom and a perforated laterally extending lug, a plurality of web members connecting said end members and spaced apart to form a slot to receive the shanks of sectional grate bar tops, and a plurality of lugs extending from one of said webs to form a support for a pivotally mounted follower bar.

5. In a non-shifting grate, a plurality of carrier bars each having a plurality of inwardly extending lugs, a plurality of stationary grate bars resting on said lugs and secured to said carrier bars by means of bolts, lateral extensions from each of said stationary grate bars, a follower bar pivotally mounted in the extensions of each of said stationary grate bars, and a rocking grate bar pivotally mounted between said carrier bars between each stationary grate bar and the follower bar of the adjacent stationary bar.

6. A top for a grate bar consisting of three parallel horizontal shelves side flanges connecting said shelves and a flattened triangular shank integral with the central horizontal shelf, and means carried by said shank for securing said top to a grate bar.

7. A rocking grate bar element including a plurality of end pieces, a trunnion on each of said end pieces for pivotally mounting the grate bar, a plurality of parallel spaced webs connecting said end pieces and providing a slot for the reception of grate bar tops, a plurality of grate bar tops having their shanks within said slot each having a plurality of horizontal shelves above the axis of said trunnions and having an integral shank below the axis of said trunnions when in ordinary position, a plurality of side flanges on each grate top connecting said shelves and an arcuate wall connecting the extremities of said side flanges, and means pivoted to the lower end of one of said side members for rocking the grate bar about its trunnions.

WILLIAM McCLAVE.